(12) United States Patent
Dietrich

(10) Patent No.: US 6,431,603 B2
(45) Date of Patent: Aug. 13, 2002

(54) SAFETY BELT HEIGHT ADJUSTING DEVICE

(75) Inventor: Guenter Dietrich, Freiberg (DE)

(73) Assignee: Dr. Ing. h.c.F. Porsche AG, Stuttgart (DE)

( * ) Notice: Subject to any disclaimer, the term of this patent is extended or adjusted under 35 U.S.C. 154(b) by 0 days.

(21) Appl. No.: 09/801,657

(22) Filed: Mar. 9, 2001

(30) Foreign Application Priority Data

Mar. 11, 2000 (DE) .......................................... 100 11 902

(51) Int. Cl.[7] .......................... B60R 22/00; B60R 22/20; B60R 22/28
(52) U.S. Cl. ............................... 280/801.1; 280/801.2; 280/805
(58) Field of Search .............................. 280/801.2, 805, 280/801.1; 297/470, 464, 468

(56) References Cited

U.S. PATENT DOCUMENTS

| 4,181,359 | A | * | 1/1980 | Ward ........................... 297/468 |
| 5,464,252 | A | * | 11/1995 | Kanazawa et al. .......... 280/805 |
| 5,529,344 | A | | 6/1996 | Yasui et al. |
| 5,692,780 | A | * | 12/1997 | Yasui ....................... 280/801.2 |
| 5,779,270 | A | * | 7/1998 | Tanaka ....................... 280/808 |
| 5,791,687 | A | * | 8/1998 | Gotou et al. ................. 280/725 |
| 5,836,613 | A | | 11/1998 | Saito et al. |
| 5,842,719 | A | * | 12/1998 | Tanaka ....................... 280/805 |
| 5,906,396 | A | * | 5/1999 | Biller ...................... 280/801.2 |
| 5,951,046 | A | * | 9/1999 | Hosoda et al. ........... 280/801.2 |
| 6,007,100 | A | | 12/1999 | Steffens, Jr. |
| 6,032,982 | A | * | 3/2000 | Pakulsky et al. ............ 280/805 |
| 6,042,176 | A | * | 3/2000 | Ikeda et al. ................. 296/189 |

FOREIGN PATENT DOCUMENTS

| DE | 44 05 106 A1 | 8/1994 |
| DE | 295 19 483 U1 | 5/1996 |
| DE | 196 51 092 A1 | 7/1997 |
| DE | 19603367 | 8/1997 |
| DE | 197 31 806 A1 | 1/1999 |

* cited by examiner

Primary Examiner—Brian L. Johnson
Assistant Examiner—Joselynn Y Sliteris
(74) Attorney, Agent, or Firm—Crowell & Moring LLP

(57) ABSTRACT

To absorb the energy in the event of a head impact, a device is provided between a safety belt locking rail and a side wall of a vehicle pillar of the device included deformation elements in the form of conical deformation elements or spring systems in the form of cup or compression springs.

16 Claims, 4 Drawing Sheets

SAFETY BELT HEIGHT ADJUSTING DEVICE

BACKGROUND AND SUMMARY OF THE INVENTION

This application claims the priority of German Patent Document 100 11 902.6, filed in Germany, Mar. 11, 2000, the disclosures of which is expressly incorporated by reference herein.

The invention relates to a device for a vertical belt adjuster of a safety belt system. Preferred embodiments involve such a belt adjuster in a vehicle pillar, with at least one deformation element between a locking rail of the belt system and the pillar.

The German Patent Document DE 295 19 483 U1 discloses a device for a vertical belt adjuster of a safety belt system in a motor vehicle. Said vertical belt adjuster is fastened by means of a locking rail to a pillar of the vehicle body by intercalating a deformation element. Furthermore, the German Patent Document DE 196 51 092 A1 (corresponding U.S. Pat. No. 5,791,687) discloses a safety belt device for a vehicle that forms an anchor rail for the belt device that is connected by means of a screw to a pillar wall of the vehicle body and the screws are anchored in an impact absorption element. In a crash situation this element deforms and absorbs plastically the impact energy. Furthermore, the German Patent Document DE 44 05 106 A1 (corresponding U.S. Pat. No. 5,464,252) discloses an anchoring arrangement for a safety belt, wherein an impact absorption element is used whose one end is fastened to one frame and whose other end is fastened to the vehicle chassis and that can be deformed by means of a load acting on the frame.

An object of the invention is to provide a vertical belt adjuster of a safety belt system that absorbs the energy in the event of a head impact and leaves the vehicle pillar largely undamaged.

The invention solves this problem by providing a device for a vertical belt adjuster of a safety belt system, which is disposed in a pillar of a vehicle, and between a locking rail of the belt system and the pillar there is at least one deformation element, characterized in that the locking rail is connected to a support plate and said support plate is held braced against a surface of a pillar wall of the vehicle body by means of a fastening plate by intercalating conical deformation elements which are spaced apart; and the fastening plate rests in an assembled operating position against a surface, facing away from the surface of the pillar wall, and in a position after head impact is detached from this surface and moves into a free space of the pillar.

Advantages obtained primarily with the invention result from the fact that conical deformation elements are disposed in such a manner between a locking rail of the device or a support plate of the device and a pillar wall that in the event of a head impact the deformation elements can be deformed plastically while avoiding damage to the vehicle pillar. The locking rail is fastened to the support plate with screws, connected to the fastening plate, so that in the event of a head impact the fastening plate, which rests against the pillar wall in an assembled operating position, moves away from the pillar wall and into the pillar in the event of a head impact.

Since the deformation elements in one design are held merely clamped between the locking rail and the pillar wall, it is possible to replace these compressed deformation elements in a simple manner. According to another design, the deformation elements are held with one end in the locking rail or in the support plate by means of a bead in a borehole. In this case the entire unit—locking rail and deformation element or support plate and deformation element—is replaced.

According to the invention, if there is no support plate, the deformation element can be fastened directly to the locking rail or braced against it. In each case the connecting screws penetrate the deformation element.

So that the deformation elements can be compressed or plastically deformed in the event of a head impact, the conical deformation element is directed with its small diameter toward the locking rail or the support plate and the larger diameter is braced against the pillar wall.

Instead of the conical deformation elements, deformation elements comprising spring systems can be used. In particular, cup springs or compression springs are used.

Other objects, advantages and novel features of the present invention will become apparent from the following detailed description of the invention when considered in conjunction with the accompanying drawings.

DETAILED DESCRIPTION OF THE DRAWINGS

Figure 1:
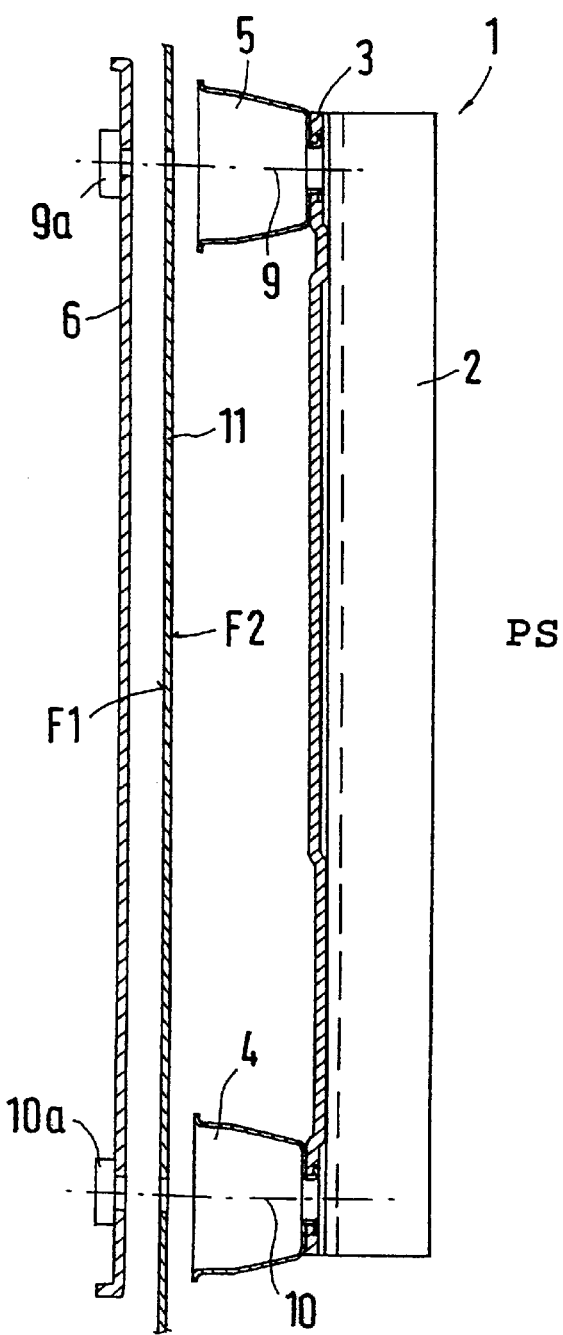
FIG. 1 is a schematic sectional vertical view of a device for a vertical belt adjuster including a support plate, conical deformation elements, and fastening plate constructed according to a preferred embodiment of the invention and taken along section line I—I of FIG. 2.
Figure 2:
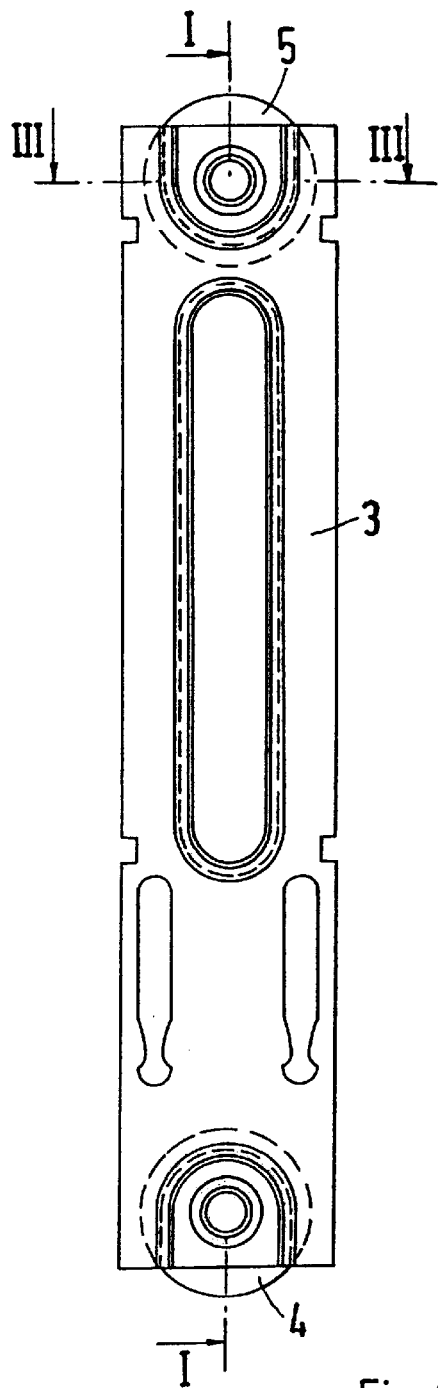
FIG. 2 is a top view of the support plate with deformation elements.

A device 1 for a vertical belt adjuster comprises in essence a locking rail 2, a support plate 3, deformation elements 4, 5 and a fastening plate 6, together forming a module. The module is fastened with connecting screws 9, 10 to a pillar wall 11 of an A and/or B pillar of the vehicle body. The locking rail faces a passenger head region in a passenger space PS.

Figure 4:
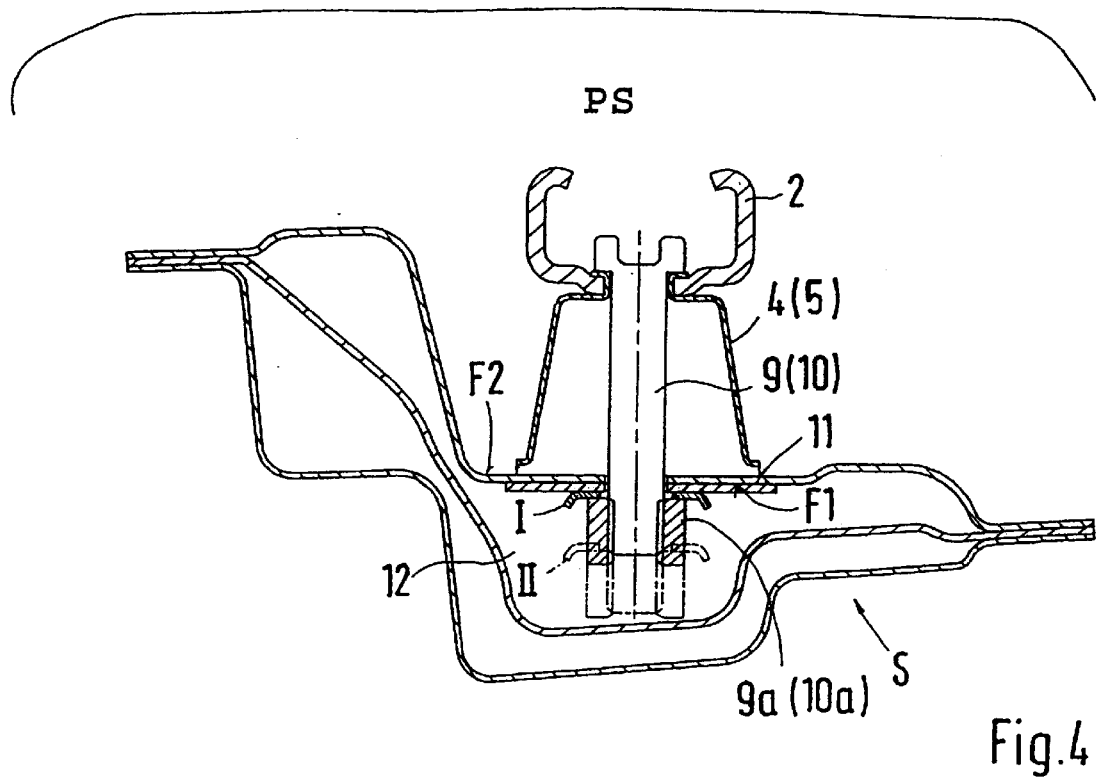
FIG. 4 is a horizontal sectional view of a vehicle pillar with installed device in an operating position and in a position following head impact.

The screws 9, 10 are anchored in weld nuts 9a, 10a, which are permanently connected to the fastening plate 6. In so doing, in an assembled operating position I the fastening plate 6 rests against the wall surface FI; and in a position II following head impact the fastening plate 6 moves away from the surface FI and into a free space 12 of the pillar S, as schematically shown in FIG. 4.

Figure 5:
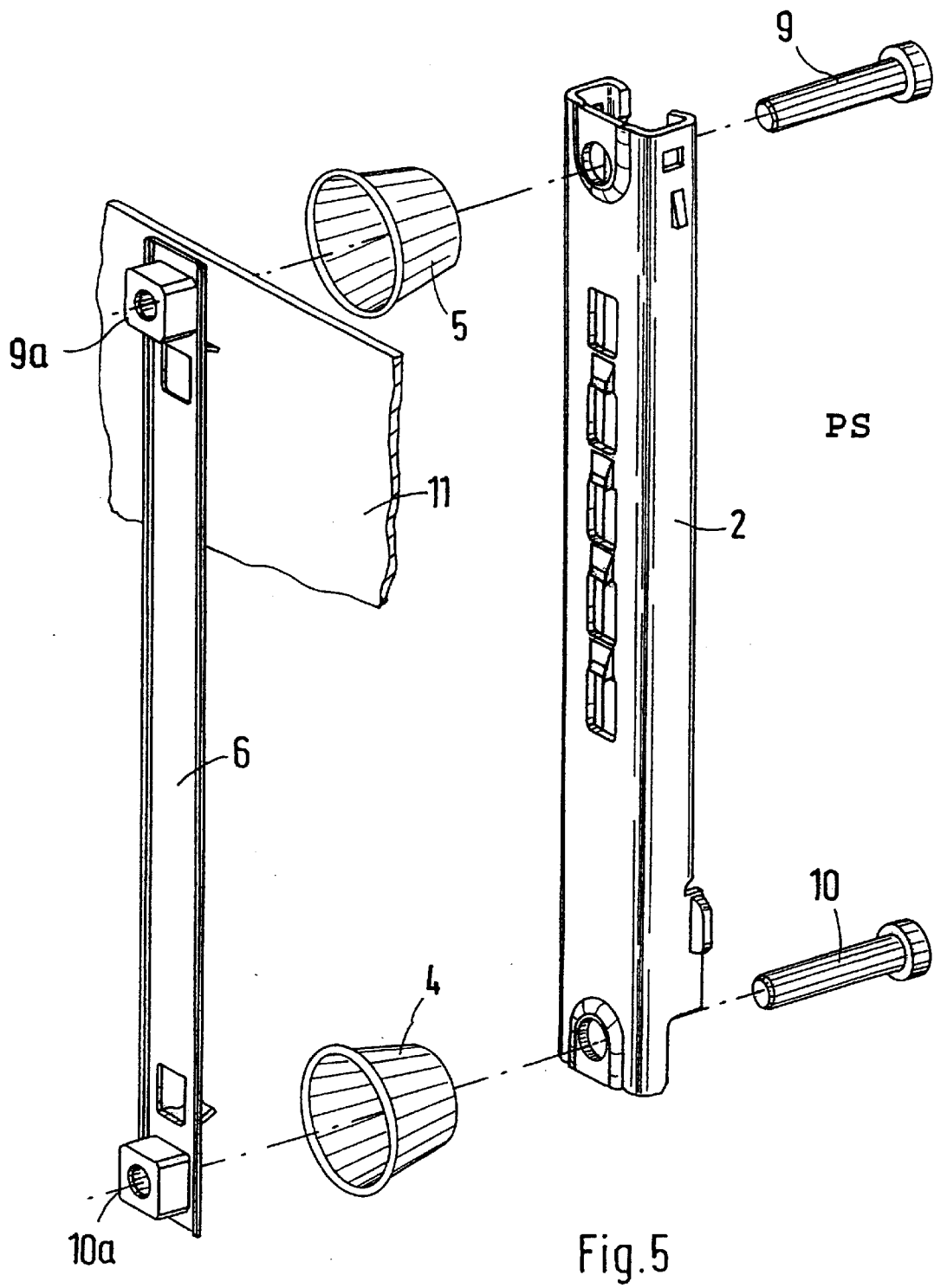
FIG. 5 is a perspective view of another preferred embodiment of the device of the invention with locking rail, deformation element and fastening plate with no support plate.
Figure 6:
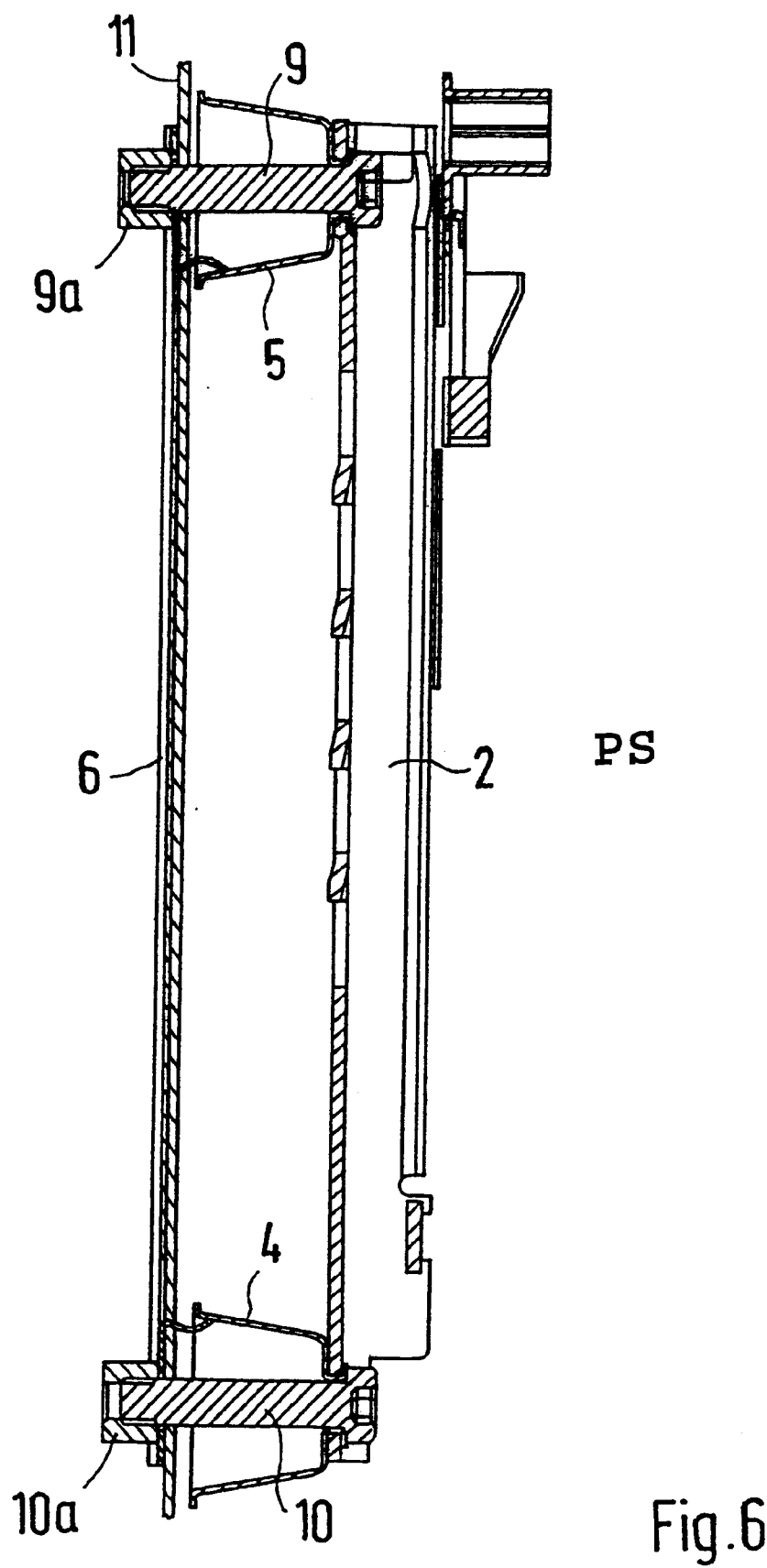
FIG. 6 is a vertical view of the device, according to FIGS. 4 and 5, with locking rail, deformation elements and fastening plate.

In the embodiments, according to FIGS. 1 to 4, the locking rail 2 is fastened to the support plate 3. According to another design, according to FIGS. 5 and 6, there is no support plate 3; and the deformation elements 4, 5 are braced directly against the locking rail 2 and the pillar wall 11.

The conical deformation elements 4, 5 are directed with their small diameter toward the locking rail 2 or, according to another embodiment, the support plate 3, whereas the larger diameter of the deformation elements 4, 5 rests against the pillar wall 11 or the surface F2 of the pillar wall 11.

Other embodiments are contemplated with deformation elements in the form of spring systems, for example cup springs or compression springs, which are not shown in detail. The deformation elements can be disposed not only on the end of the locking rail 2 or the support plate 3, but also extend over the entire length. In this case more than two deformation elements are contemplated.

Figure 3:
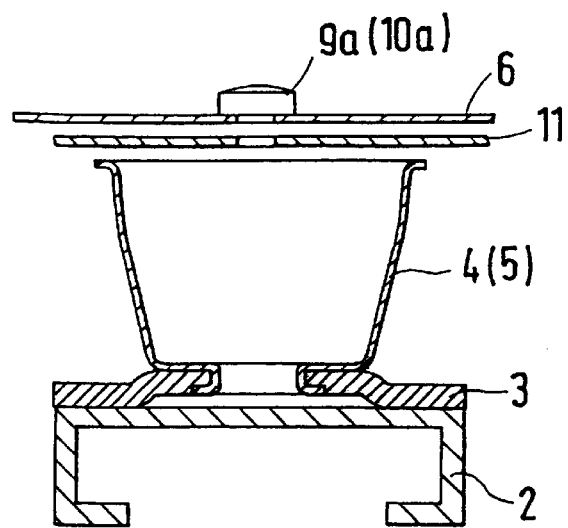
FIG. 3 is an enlarged sectional view along the line III—III of FIG. 2.

As shown in detail in FIGS. 1, 3, and 4, the conical deformation element 4, 5 can be held by a bead or crimp in a borehole of the locking rail 2 or the support plate 3 so that an interchangeable module can be produced.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. Device for a vertical belt adjuster of a safety belt system, which is disposed at a pillar of a vehicle, and between a locking rail of the belt system and the pillar there is at least one deformation element, wherein the locking rail is held at a pillar wall of a vehicle body by a fastening plate by intercalating conical deformation elements which are spaced apart; and wherein the fastening plate rests in an assembled operating position against a first surface of the pillar wall facing away from a surface of the pillar wall facing the deformation elements, and in a position after head impact is detached from this first surface and moves into a free space of the pillar.

2. Device as claimed in claim 1, comprising a support plate disposed between the locking rail and the deformation elements, wherein the respective deformation elements are disposed between the support plate and the pillar wall and are penetrated by fastening screws engageable in weld nuts of the fastening plate.

3. Device as claimed in claim 1, wherein the deformation elements engage the locking rail and are disposed between the pillar wall and locking rail.

4. Device as claimed in claim 1, wherein the deformation elements are directed with their smaller diameter toward the locking rail and with their larger diameter toward the pillar wall.

5. Device as claimed in claim 2, wherein the deformation elements are directed with their smaller diameter toward the locking rail and with their larger diameter toward the pillar wall.

6. Device as claimed in claim 2, wherein the deformation elements are directed with their smaller diameter toward the locking rail and with their larger diameter toward the pillar wall, and wherein a smaller diameter end of the deformation elements engages the support plate.

7. Device as claimed in claim 1, wherein the deformation elements are each held with the locking rail by a bead which is provided in a base of the respective deformation element and is located in a borehole of the locking rail.

8. Device as claimed in claim 2, wherein the deformation elements are each held with the locking rail by a bead which is provided in a base of the respective deformation element and is located in a borehole of the locking rail.

9. Device as claimed in claim 4, wherein the deformation elements are each held with the locking rail by a bead which is provided in a base of the respective deformation element and is located in a borehole of the locking rail.

10. Device as claimed in claim 2, wherein the deformation elements are each held with the support plate by a bead which is provided in a base of the respective deformation element and is located in a borehole of the support plate.

11. Device as claimed in claim 6, wherein the deformation elements are each held with the support plate by a bead which is provided in a base of the respective deformation element and is located in a borehole of the support plate.

12. A vehicle safety belt adjuster assembly for a vehicle having a vehicle pillar with a hollow space therein, comprising:

a fastening plate disposable in use in a hollow space of a vehicle pillar at a first side of a vehicle pillar wall, at least one plastically deformable deformation element disposable in use at a second side of the vehicle pillar wall, said second side facing a vehicle passenger side, a belt system locking rail, and at least one fastener operable to hold the at least one deformation element between the second side of the pillar wall and the locking rail, said fastener being movable with said fastening plate into a pillar hollow space at said first side of the pillar wall during deformation of said at least one deformation element.

13. An assembly according to claim 12, wherein said at least one deformation element includes a plurality of conical deformation elements spaced from one another along said locking rail and fastening plate.

14. An assembly according to claim 13, wherein said conical deformation elements widen in a direction from the rail toward the pillar wall.

15. An assembly according to claim 14, wherein said at least one fastener includes a plurality of threaded bolts which have a bolt head engageable at one side of a respective deformation element and a thread end engageable in a threaded nut fixed to the fastening plate.

16. An assembly according to claim 15, comprising a locking rail support plate interposed between the locking rail and the deformation elements.

* * * * *